United States Patent [19]

Kluge

[11] Patent Number: 4,797,781
[45] Date of Patent: Jan. 10, 1989

[54] EARTHQUAKE RESISTANT HIGH VOLTAGE DEVICE

[75] Inventor: Dietrich Kluge, Waldshut-Tiengen, Fed. Rep. of Germany

[73] Assignee: BBC Brown Boveri AG, Baden, Switzerland

[21] Appl. No.: 124,561

[22] Filed: Oct. 19, 1987

[30] Foreign Application Priority Data

Oct. 23, 1986 [DE] Fed. Rep. of Germany ....... 3636009

[51] Int. Cl.⁴ .................... H02B 1/00; H01F 27/06
[52] U.S. Cl. ........................... 361/332; 174/42; 174/161 R; 200/301; 248/610; 336/68; 361/335; 361/376
[58] Field of Search ............... 174/42, 43, 161 R; 52/167; 200/301; 248/610, 612, 613; 361/331, 332, 333, 335, 340, 376; 336/68

[56] References Cited

U.S. PATENT DOCUMENTS

| | | | |
|---|---|---|---|
| 1,326,307 | 12/1919 | Thomas | 174/161 R X |
| 3,726,986 | 4/1973 | Higaki et al. | 174/43 |
| 4,277,639 | 7/1981 | Olsson | 174/43 X |
| 4,546,223 | 10/1985 | Jacquemet et al. | 361/376 X |

FOREIGN PATENT DOCUMENTS

| | | | |
|---|---|---|---|
| 511890 | 11/1930 | Fed. Rep. of Germany | 361/333 |
| 2348135 | 4/1975 | Fed. Rep. of Germany. | |
| 2524701 | 10/1983 | France. | |
| 331048 | 10/1935 | Italy | 174/161 R |

OTHER PUBLICATIONS

Austrian Journal: "Electrotechnik und Maschinenbau", (E and M), vol. 101, Issue 7, (1984), pp. 336-343.
Moors, "Seismic Behavior of Very High Voltage Current Transformers", IEEE Power Engineering Review, Jan. 1985, pp. 43 and 44.

Primary Examiner—Laramie E. Askin
Attorney, Agent, or Firm—Werner W. Kleeman

[57] ABSTRACT

To install a high voltage device, particularly a high voltage breaker having two interrupting chambers and a high voltage insulator in a simple earthquake resistant manner, an end flange of the high voltage insulator on the ground potential side is rotatably suspended from the support beam of a steel frame. A vibration damper is preferably provided between the high voltage breaker and its suspension device. The vibration damper is attached to a ball received in a socket which is mounted on the support beam. The two interrupting chambers which are connected to one another in a V-shape, are connected to high voltage lines. This inverted suspension is also suitable for current and voltage transformers and overvoltage arresters.

8 Claims, 1 Drawing Sheet

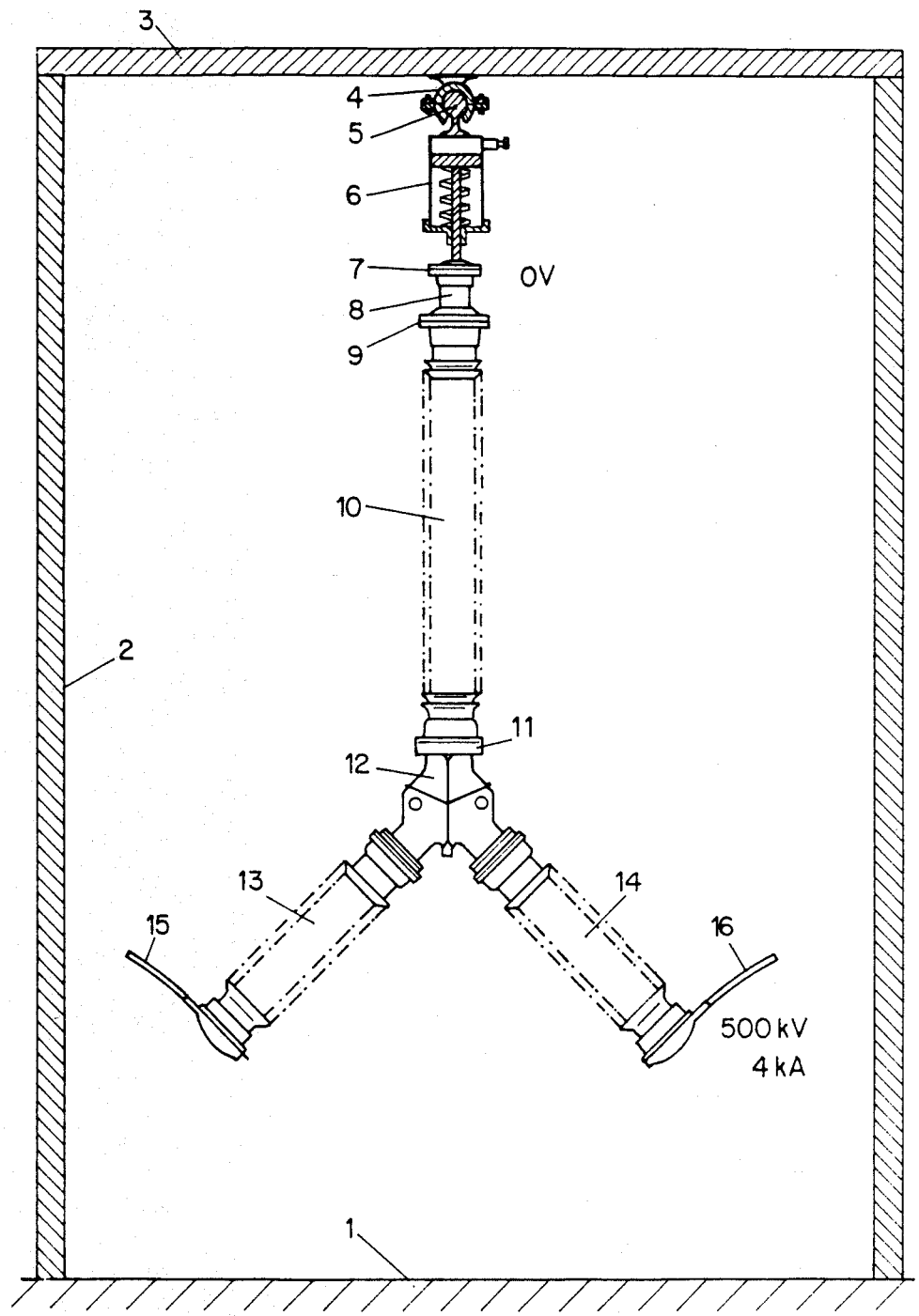

EARTHQUAKE RESISTANT HIGH VOLTAGE DEVICE

BACKGROUND OF THE INVENTION

The present invention is based on a new and improved construction of an earthquake resistant high voltage device.

In its more particular aspects, the present invention specifically relates to a new and improved construction of an earthquake resistant high voltage device containing at least one connection to a high voltage line and at least one high voltage insulator connected between a high voltage side of the high voltage device and ground potential. An earthquake reistant high voltage device of this type is known, for example, from the Austrian journal: "Elektrotechnik und Maschinenbau" (E and M), volume 101, issue 7 (1984), pages 336–343. According to this publication, inadmissible stresses can occur in circuit breakers at the mounting points of the lower porcelain supports without special protective measures. To safeguard against earthquakes, it is proposed to use stronger porcelain supports or damping elements for circuit breakers. In addition, it is recommended to connect tightly strung cables to the electrical devices so that these devices can deform by about ±15 cm during an earthquake before the cables are tightly stretched and significant cable forces are transmitted. An abrupt pulling of the cables can result in damage in the porcelain, particularly in the case where the porcelain exhibits fine cracks.

With respect to the relevant prior art, additional reference is made to U.S. Pat. No. 3,726,986, granted Apr. 10, 1973, from which it is known to suspend an electrical device via porcelain insulators on its high voltage side and to dispose vibration dampers on the ground potential side. The disadvantageous factor in this construction is that expensive porcelain insulators are needed for the suspension and that a support frame is needed which is higher by the insulation gap which approximately corresponds to the length of these porcelain insulators.

SUMMARY OF THE INVENTION

Therefore, with the foregoing in mind it is a primary object of the present invention to provide a new and improved construction of an earthquake resistant high voltage device which is not afflicted with the drawbacks and limitations of the prior art constructions heretofore discussed.

It is a significant object of the present invention to provide a new and improved construction of an earthquake resistant high voltage device which can be manufactured in a comparatively simple manner and yet exhibits improved earthquake resistance.

Now in order to implement these and still further objects of the invention, which will become more readily apparent as the description proceeds, the earthquake resistant high voltage device of the present development is manifested by the feature that the high voltage insulator is movably suspended on the side of the ground potential.

An advantage of the invention consists in the possibility of more inexpensive production. No additional insulators or holding cables are required for the suspension. Elaborate earthquake calculations and tests are no longer needed. The suspension design is very simple. A steel design for the suspension can also be obtained at advantageous price. In an advantageous further development of the inventive construction, the high voltage insulator is suspended via a vibration damper on the ground potential side. Thus, by interposing a preferably commercially available vibration damper between the actual high voltage device and the means for suspending the high voltage insulator, vibrations transmitted by the steel structure can be additionally damped so that the high voltage device is not damaged even in the case of strong ground vibrations.

BRIEF DESCRIPTION OF THE DRAWING

The invention will be better understood and objects other than those set forth above will become apparent when consideration is given to the following detailed description thereof. Such description makes reference to the annexed single drawing which shows a partially sectional view of an exemplary embodiment of the inventive high voltage device.

DETAILED DESCRIPTION OF THE PREFERRED EMBODIMENTS

Describing now the drawings, it is to be understood that only enough of the construction of the high voltage device has been shown as needed for those skilled in the art to readily understand the underlying principles and concepts of the present development, while simplifying the showing of the drawings. Turning attention now specifically to the single FIGURE of the attached drawing, the high voltage device illustrated therein by way of example and not limitation will be seen to comprise a high voltage breaker. Such commercially available V-shaped high voltage breaker with two interrupting chambers 13 and 14 of identical construction and a high voltage insulator or insulator tube 10 is movably suspended via a damping device or a commercially available vibration damper 6 and a suspension device from a support beam 3 of a frame 2 which may be made of steel. The frame 2 is standing on a horizontal floor 1 which is at ground potential. Current conductors or high voltage lines 15 and 16 are connected to the two interrupting chambers 13 and 14 designed for a direct voltage of 500 kV and a current of 4 kA to be interrupted. The two interrupting chambers 13 and 14 are connected to one another via an articulated-shaft housing 12 and to the insulator tube 10 of ceramic or fiberglass reinforced plastic via a flange 11 on the high voltage side. The insulator tube 10 is connected via a flange 9 on the ground potential side to a housing 8 for a pneumatic driving mechanism and the latter is connected via another flange 7 to the vibration damper 6.

The vibration damper 6 has a liquid-filled cylinder in which a piston, which seals not quite tightly, is movably supported by a compression spring. It exhibits particularly good damping in the range of low frequencies of the vibration spectrum of earthquakes, that is to say, from 2 Hz to 35 Hz.

The suspension device consists of a socket 4 which is attached to the support beam 3 and a ball 5 which is permanently joined to the vibration damper 6. The high voltage breaker is rotatably supported via this suspension device and connected to ground potential of 0 V. When an earthquake occurs, the high voltage breaker can vibrate freely or damped, respectively, without inadmissibly high forces or torques being exerted on the insulator tube 10. The important factor is that the high voltage breaker is suspended from its normal grounded mounting point, that is to say upside down, from a turning knuckle.

Such a suspension with zero potential at the suspension device is also particularly suitable for current and voltage transformers of outdoor high voltage installations, for overvoltage arresters, capacitors and reactors. Because of their narrow construction and the simultaneously high center of gravity, earthquake strength is of particular interest for compressed air and sulfurhexafluoride (SF$_6$) circuit breakers, isolators and the above-mentioned high voltage devices.

Instead of a suspension device with the ball 5 and the socket 4, for example, a suspension with hook and lug can also be used.

While there are shown and described present preferred embodiments of the invention, it is to be distinctly understood that the invention is not limited thereto, but may be otherwise variously embodied and practiced within the scope of the following claims.

What I claim is:

1. An earthquake resistant high voltage device having a high voltage side and a ground potential side and comprising:
    at least one connection to a high voltage line;
    at least one high voltage insulator between the high voltage side of the high voltage device and the ground potential side;
    means for rotatably movably suspending said at least one high voltage insulator from the ground potential side; and
    at least one vibration damper arranged between said at least one high voltage insulator and said means for rotatably movably suspending said at least one high voltage insulator.

2. The earthquake resistant high voltage device as claimed in claim 1, wherein the high voltage device comprises at least one high voltage breaker.

3. The earthquake resistant high voltage device as claimed in claim 1, wherein the high voltage device comprises at least one current transformer.

4. The earthquake resistant high voltage device as claimed in claim 1, wherein the high voltage device comprises at least one voltage transformer.

5. The earthquake resistant high voltage device as claimed in claim 1, wherein the high voltage device comprises at least one overvoltage arrester.

6. The earthquake resistant high voltage device as claimed in claim 1, wherein:
    said at least one vibration damper is structured to possess high attenuation efficiency in the earthquake related frequency range of 2 Hz to 35 Hz.

7. An earthquake resistant high voltage device having a high potential side and a ground potential side and comprising:
    a least one high voltage breaker;
    at least one connection from said at least one high voltage breaker to a high voltage line;
    at least one high voltage insulator connected between the high voltage side and the ground potential side of said at least one high voltage breaker;
    means for rotatably movably suspending the high voltage insulator from the ground potential side of said at least one high voltage breaker;
    said rotatably movably suspending means suspending said at least one high voltage breaker from the ground potential side in a reverse position as compared to a normal position in which said at least one high voltage breaker has a grounded base point; and
    said at least one high voltage breaker being supported in a substantially zero-load carrying manner on the high voltage side of said at least one high voltage breaker.

8. The earthquake resistant high voltage device as claimed in claim 7, further including:
    at least one overvoltage arrester.

* * * * *